(12) United States Patent
Verma et al.

(10) Patent No.: US 10,210,224 B2
(45) Date of Patent: Feb. 19, 2019

(54) DYNAMIC DATA COPY UTILITY

(71) Applicant: BANK OF AMERICA CORPORATION, Charlotte, NC (US)

(72) Inventors: Sandeep Verma, Haryana (IN); Madhavan Ramamoorthy, Andhra Pradesh (IN); Randolph J. Lahm, Centennial, CO (US); Sunil Mathur, Hockessin (DE)

(73) Assignee: BANK OF AMERICA CORPORATION, Charlotte, NC (US)

( * ) Notice: Subject to any disclaimer, the term of this patent is extended or adjusted under 35 U.S.C. 154(b) by 855 days.

(21) Appl. No.: 14/502,935

(22) Filed: Sep. 30, 2014

(65) Prior Publication Data

US 2016/0092538 A1    Mar. 31, 2016

(51) Int. Cl.
*G06F 17/30* (2006.01)

(52) U.S. Cl.
CPC .. *G06F 17/30557* (2013.01); *G06F 17/30289* (2013.01)

(58) Field of Classification Search
CPC ............... G06F 17/30557; G06F 17/30289
USPC .......................................................... 707/639
See application file for complete search history.

(56) References Cited

U.S. PATENT DOCUMENTS

| 6,598,037 | B1* | 7/2003 | Craig | G06F 17/30607 |
| | | | | 707/705 |
| 9,679,037 | B2* | 6/2017 | Srinivasan | G06F 17/30575 |
| 2003/0217069 | A1* | 11/2003 | Fagin | G06F 17/30569 |
| 2011/0191303 | A1* | 8/2011 | Kaufman | G06F 17/30286 |
| | | | | 707/684 |
| 2014/0304229 | A1* | 10/2014 | Zhu | G06F 17/30 |
| | | | | 707/634 |
| 2015/0234884 | A1* | 8/2015 | Henriksen | G06F 17/30359 |
| | | | | 707/623 |

(Continued)

OTHER PUBLICATIONS

SQL Azure Team. "Exporting Data from SQL Azure: Import/Export Wizard." May 19, 2010. 10 pages. https://azure.microsoft.com/en-us/blog/exporting-data-from-sql-azure-importexport-wizard/.*

(Continued)

*Primary Examiner* — Kimberly L Wilson
(74) *Attorney, Agent, or Firm* — Michael A. Springs; Moore & Van Allen PLLC; James C. Edwards

(57) ABSTRACT

Embodiments of the invention relate to systems, methods, and computer program products for a high performance data copy utility that is operable to dynamically copy data from a source database to a target database in an object-relational database environment. High performance is realized by defining, prior to copying the data, performance boundaries of the source and target environment, such as the quantity of data (i.e., commit points) and quantity of parallel processes (i.e., parallel threads) applicable to a copy job. Moreover, the copying schema of the present invention allows for data to be copied from one database to another database without the need higher level privileges, such as database administrator (DBA) or data definition language (DDL), which would otherwise require changing the structure of the database. In this regard, embodiments of the present invention rely solely on lower-level data manipulation language (DML) privileges configured for inserting, updating and deleting data structures.

16 Claims, 13 Drawing Sheets

(56) References Cited

U.S. PATENT DOCUMENTS

2015/0286537 A1* 10/2015 Klose .................. G06F 11/1464
707/652

OTHER PUBLICATIONS

Archibus Smart Client. "Data Transfer Overview." Feb. 5, 2011. 4 pages. https://www.archibus.com/ai/abizfiles/v21.3_help/archibus_help/Subsystems/smart_client/smart_client.htm#fim/managing_wc/data_transfer/data_transfer.htm.*

Add Data by using the Table Import Wizard (Tutorial). May 18, 2010. 4 pages. https://technet.microsoft.com/en-us/library/gg399137(v=sql.105).aspx.*

Oracle. "Upgrading Oracle Applications." Jan. 2001. 412 pages. http://docs.oracle.com/cd/A88418_03/acrobat/r1153ug.pdf.*

* cited by examiner

| COMPARISON SUMMARY 302 | | | |
|---|---|---|---|
| TABLES (NO CHANGE) | TABLES (MODIFIED) | TABLES (NEW) | TABLES (MISSING) |
| 53 | 0 | 0 | 0 |
| 304 | 306 | 308 | 310 |

| EXECUTION SUMMARY 312 | | | | |
|---|---|---|---|---|
| WAITING | IN-PROCESS | EXCLUDED | CONFIGURATION | FAILED |
| 15 | 1 | 0 | 32 | 0 |
| 314 | 316 | 318 | 320 | 322 |

| EXECUTION TIME 324 |
|---|
| 00 : 02 : 11 |

EXISTING TABLES 340

| TABLE NAME 328 | DEPENDENT ON 330 | CLEAN-UP 332 | COPY 336 | SQL QUERY |
|---|---|---|---|---|
| ☑ APPLICATION | | DONE | COMPLETED | EDIT |
| ☑ ATTRIBUTE | ATTRIBUTE TYPE, CONTENT | DONE | 49000 OUT OF 220342 368 | EDIT |
| ☑ ATTRIBUTE HOLD | ATTRIBUTE TYPE GROUP | DONE | COMPLETED | EDIT |
| ☑ ATTRIBUTE SET MAP | DATA TYPE | DONE | WAITING | EDIT |
| ☑ ATTRIBUTE TYPE | ATTRIBUTE TYPE | DONE 360 | COMPLETED 366 | EDIT |
| ☑ ATTRIBUTE TYPE EVENTS | ATTRIBUTE TYPE, ATTRIBUTE TYPE GROUP | DONE | WAITING | EDIT |
| ☑ ATTRIBUTE TYPE GROUP | | DONE | COMPLETED | EDIT |
| ☑ ATTRIBUTE TYPE GROUP MAP | CONTENT | DONE | WAITING | EDIT |
| ☑ CARD LOGO | | DONE | WAITING | EDIT |
| ☑ CNS CHANGE OCCURRED | | DONE | WAITING | EDIT |
| ☑ CNS NOTIFY URL | | DONE | WAITING | EDIT |
| ☑ COMPONENT VERSION | | DONE | WAITING | EDIT |

| ☐ TABLE NAME 328 | DEPENDENT ON 330 | CLEAN-UP 332 | COPY 336 | SQL QUERY 340 |
|---|---|---|---|---|
| ☑ APPLICATION | | DONE | COMPLETED | EDIT |
| ☑ ATTRIBUTE | ATTRIBUTE TYPE, CONTENT | DONE | COMPLETED | EDIT |
| ☑ ATTRIBUTE HOLD | | DONE | COMPLETED | EDIT |
| ☑ ATTRIBUTE SET MAP | ATTRIBUTE TYPE GROUP | DONE | COMPLETED | EDIT |
| ☑ ATTRIBUTE TYPE | DATA TYPE | DONE | COMPLETED | EDIT |
| ☑ ATTRIBUTE TYPE EVENTS | ATTRIBUTE TYPE 370 | SUCCESS DATA MIGRATED SUCCESSFULLY. | COMPLETED | EDIT |
| ☑ ATTRIBUTE TYPE GROUP | | [SAVE & CLOSE] [CLOSE] 374 | COMPLETED | EDIT |
| ☑ ATTRIBUTE TYPE GROUP MAP | ATTRIB | 372 (RECOMMENDED) | COMPLETED | EDIT |
| ☑ CARD LOGO | CONTE | DONE | COMPLETED | EDIT |
| ☑ CNS CHANGE OCCURRED | | DONE 360 | COMPLETED | EDIT |
| ☑ CNS NOTIFY URL | | DONE | COMPLETED | EDIT |
| ☑ COMPONENT VERSION | | DONE | COMPLETED | EDIT |
| ☑ CONTENT | CONTENT CONTENT TYPE | DONE | COMPLETED | EDIT |
| ☑ CONTENT DEFAULT | | DONE | COMPLETED | EDIT |
| ☑ CONTENT TYPE | | DONE | COMPLETED | EDIT |
| ☑ DATA TYPE | | DONE | COMPLETED | EDIT |
| ☑ DATA UPDATE LOG | | | | |
| ☑ DC ASSOCIATION | DC GROUP | | | |

*FIG. 10*

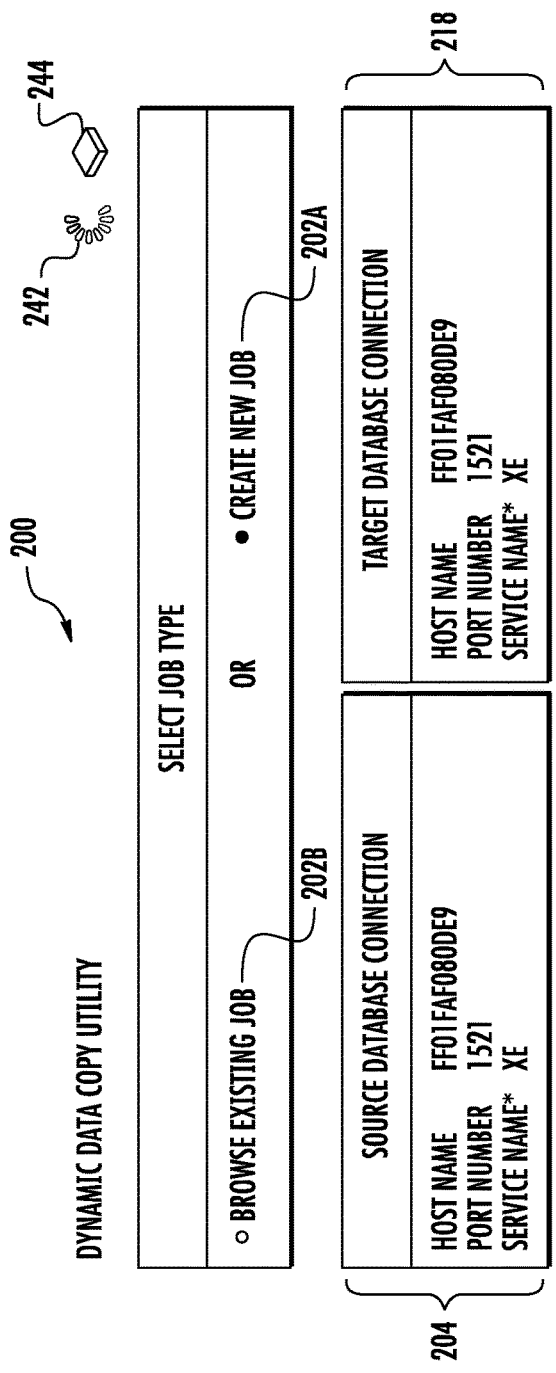
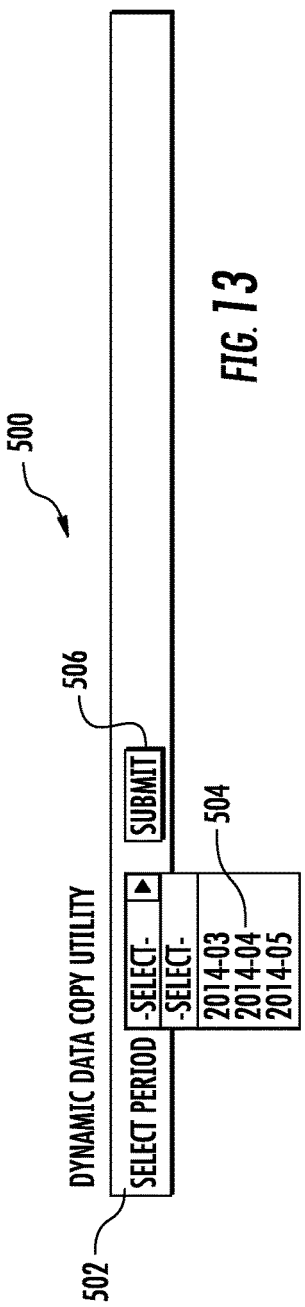
FIG. 12
FIG. 13

DYNAMIC DATA COPY UTILITY

SELECT PERIOD [-SELECT- ▶] [SUBMIT]

DATA COPY SUMMARY#

| 608 USERNAME | SOURCE DETAIL 610 | | TARGET DETAIL 616 | | TABLE STATUS 622 | | | DATE AND TIME | TIME TAKEN |
|---|---|---|---|---|---|---|---|---|---|
| | SERVICE NAME 612 | SCHEMA NAME 614 | SERVICE NAME 618 | SCHEMA NAME 620 | COMPLETED 624 | FAILED 628 | EXCLUDED 630 | 632 | 634 |
| ASIANBK | XE | CMS_SOURCE | XE | CMS_TARGET | 53 | 0 | 0 | 05/02/2014 7:05:389 | 00:02:53 |
| ASIANBK | XE | CMS_SOURCE | XE | CMS_TARGET | 59 | 0 | 0 | 05/02/2014 7:05:389 | 00:03:16 |

FIG. 14

DYNAMIC DATA COPY UTILITY

FIELD

In general, embodiments of the invention relate to electronic data management, systems, apparatus and computer program products for high performance data copy capabilities between a specified source database and a target database.

BACKGROUND

In many business applications there are needs to perform network-based data copy operations, such as recurring copying of a source database to a target database in an object-relational database management environment or the like.

Current copying platforms are somewhat limited in terms of the functionality provided. Many of the current copying platforms merely override all of the currently existing data with the data being copied; resulting in the target database having an exact replica of the source database. Thus, in such copying platforms, the user is not provided the option of changing database structure to modify/filter data from the copy process, exclude tables or the like. Other copying platforms require the table formats to be identical in order perform copying, such that, any change in quantity of columns will prohibit copying.

Additionally, many current copying platforms do not provide for the intelligence required to decipher copying constraints; such as identifying source structure and target structure; matching table-to-table, column-to-column, row-to-row (e.g., hierarchical data) and the like; ordering the copying of tables to take into account table dependencies and the like. Moreover, such current copying platforms typically require heightened account privileges, such as Database Administrator (DBA) or extended Data Definition Language (DDL) in order to manually perform the configuration operations and custom programming complexity needed to overcome copying constraints.

In addition, current copying platforms are limited in their ability to control the performance (i.e., speed) of the copy operation. Such platforms fail to take into account other concurrent database users that may be impacted by the data copy function, network latency, network configuration and/or data base size in determining optimal performance requirements for the data copy job at hand.

Therefore, a need exists to develop systems, methods and the like that provide for high performance data copy capabilities between source and target data schemas in an object-relational database environment. In this regard, the desired data copy utility should be tunable, in terms of copying speed, to the specific copying environment; taking into account such factors as network configuration, network latency, database size and the like. Moreover, the desired data copy utility should be highly configurable and intelligent such that it allows for structural changes in the data being copied (i.e., more than just copying of exact replicas) and is able to automatically identify source and target structure and match data table-to-table, column-to-column, row-to-row, and the like. Additionally, the desired copy utility should operate under lower level account privileges that allow users to manage data within existing structures, without having to require the data copy process occur under higher level privileges, which would be required if customer programming and/or changes to the structure of the databases were required.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for a high performance data copy utility that is operable to dynamically copy data from a source database to a target database in an object-relational database environment. High performance is realized by defining, prior to copying the data, performance boundaries of the source and target environment, such as the quantity of data (i.e., commit points) and quantity of parallel processes (i.e., parallel threads) applicable to a copy job. In additional embodiments, a user-interface is accessible to users that provides for interactive progress updates of the copy job as the copy job occurs. Moreover, the copying schema of the present invention allows for data to be copied from one database to another database without the need higher level privileges, such as database administrator (DBA) or data definition language (DDL), which would otherwise require changing the structure of the database and/or custom code. In this regard, embodiments of the present invention rely solely on lower-level data manipulation language (DML) privileges configured for inserting, updating and deleting data structures.

An apparatus for dynamically copying data from a source database to a target database in an object-relational database environment defines first embodiments of the invention. The apparatus includes a computing platform including a memory and at least one processor in communication with the memory. The apparatus further includes a data copy module that is stored in the memory and executable by the processor. The data copy module is configured to receive first user-inputs that define details of a source connection for the source database and a target connection for the target database. In addition the data copy module is configured to receive a second user-input that defines a quantity of data transferred per database call allowed for copying the source database to the target database. Additionally, the data copy module is configured to receive a third user-input that defines a quantity of parallel processes that are executed concurrently during the copying of the source database to the target database. Moreover, once the quantity of defined data transferred per database call and the quantity of defined parallel processes have been defined, the data copy module is configured to copy data in the source database to the target database, accordingly.

In additional embodiments of the apparatus the data copy module is further configured to generate and provide display of a user-interface that is configured to indicate a dynamic status of the copying of the source database to the target database. In such embodiments of the apparatus, the status includes (1) a listing of each table existing the source database, (2) an indication of whether data in each table in the target database has been deleted prior to copying the table from the source database to the target database, and (3) and indication of whether copying of each table (a) has yet to begin, (b) is in progress, (c) is completed, or (d) has failed. In related embodiments of the apparatus, the user-interface that is generated and provided by the data copy module provides for (1) a comparison summary including (i) a quantity of tables copied without modification, (ii) a quantity of tables copied with modification, (iii) a quantity of new tables created, and (iv) a quantity of tables missing; (2) an execution summary including (i) a quantity of tables waiting to be copied, (ii) a quantity of tables currently being copied, (iii) a quantity of tables excluded from copying, (iv) a quantity of tables having completed copying, and (v) a quantity of tables that failed to copy; and (3) a timer that provides a running indication of copy execution time. In still further related of the apparatus, the user-interface that is generated and provided by the data copy module provides an indication of tables in the target database that are dependent on one or more other tables in the data base, wherein the indication includes a name of the one or more other tables. A table that is dependent upon other tables may not begin the copy process until the copying of the other dependent tables has been completed.

In other specific embodiments of the apparatus, the data copy module is further configured to receive a fourth user-input that selects a table from the source database that is excluded from copying to the target database. In such embodiments of the apparatus, the data copy module is further configured to, in response to receiving the fourth user-input, provide indication of one or more dependent tables that depend from the selected table, such that excluding the selected table also automatically excludes the one or more dependent tables.

In still further specific embodiments of the apparatus, the data copy module is further configured to receive a fourth user-input that selects a table from the source database and, upon selection of the table, allows the user to identify data from the table which is to be omitted from the copying of the source database to the target database. In specific embodiments, the data copy module is configured to allow users to modify auto-generated Structured Query Language (SQL) to filter out or mask any existing data that the user desires to omit from the copy process.

Additionally, in other specific embodiments of the apparatus, the data copy module is further configured to receive a fourth user-input that is configured to save, as a copy job, a customized transformation model of the copying of the source database to the target database. In such embodiments of the apparatus, the data copy module is further configured to receive a fifth user-input that selects the copy job from a listing of saved existing copy jobs and, upon selection, re-executes the transformation model to perform a subsequent copying of the source database to the target database or another target database (i.e., another environment).

Moreover, in still further embodiments of the apparatus, the data copy module is configured to (1) receive a fourth user-input that selects an execution history option and, (2) upon selection of a previous time period, provide display of a user-interface that indicates details of database copy jobs performed during the selected time period, wherein the details include identity of the who performed the database copy job, details of the source database, details of the target database, copy job results, data and time of copy job and execution time of copy job. A computer program product including a non-transitory computer-readable medium defines second embodiments of the invention. The computer-readable medium includes a first set of codes for causing a computer to receive first user-inputs that define details of a source connection for a source database and a target connection for a target database, In addition, the computer-readable medium includes a second set of codes for causing a computer to receive a second user-input that defines a quantity of data transferred per database call. Additionally, the computer-readable medium includes a third set of codes for causing a computer to receive a third user-input that defines a quantity of parallel processes that are executed concurrently during the copying of the source database to the target database. Moreover, the computer-readable medium includes a fourth set of codes for causing a computer to copy data in the source database to the target database, wherein the copying occurs according to the quantity of defined data allowed to be transferred per database call and the quantity of defined parallel processes.

A method for dynamically copying data from a source database to a target database in an object-relational database environment defines third embodiments of the invention. The method includes receiving, by a computing device processor, first user-inputs that define details of a source connection for a source database and a target connection for a target database. In addition, the method includes receiving, by a computing device processor, a second user-input that defines a quantity of data allowed to be transferred per database call. Additionally, the method includes receiving, by a computing device processor, a third user-input that defines a quantity of parallel processes that are executed concurrently during the copying of the source database to the target database. Moreover, the method includes copying, by a computing device processor, data in the source database to the target database, wherein the copying occurs according to the quantity of defined data allowed to be transferred per database call and the quantity of defined parallel processes.

Thus, further details are provided below for systems, apparatus, methods and computer program products for products for a high performance data copy utility that is operable to dynamically copy data from a source database to a target database in an object-relational database environment. High performance is realized by defining, prior to copying the data, performance boundaries of the source and target environment, such as the quantity of data (i.e., commit points) and quantity of parallel processes (i.e., parallel threads) applicable to a copy job.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
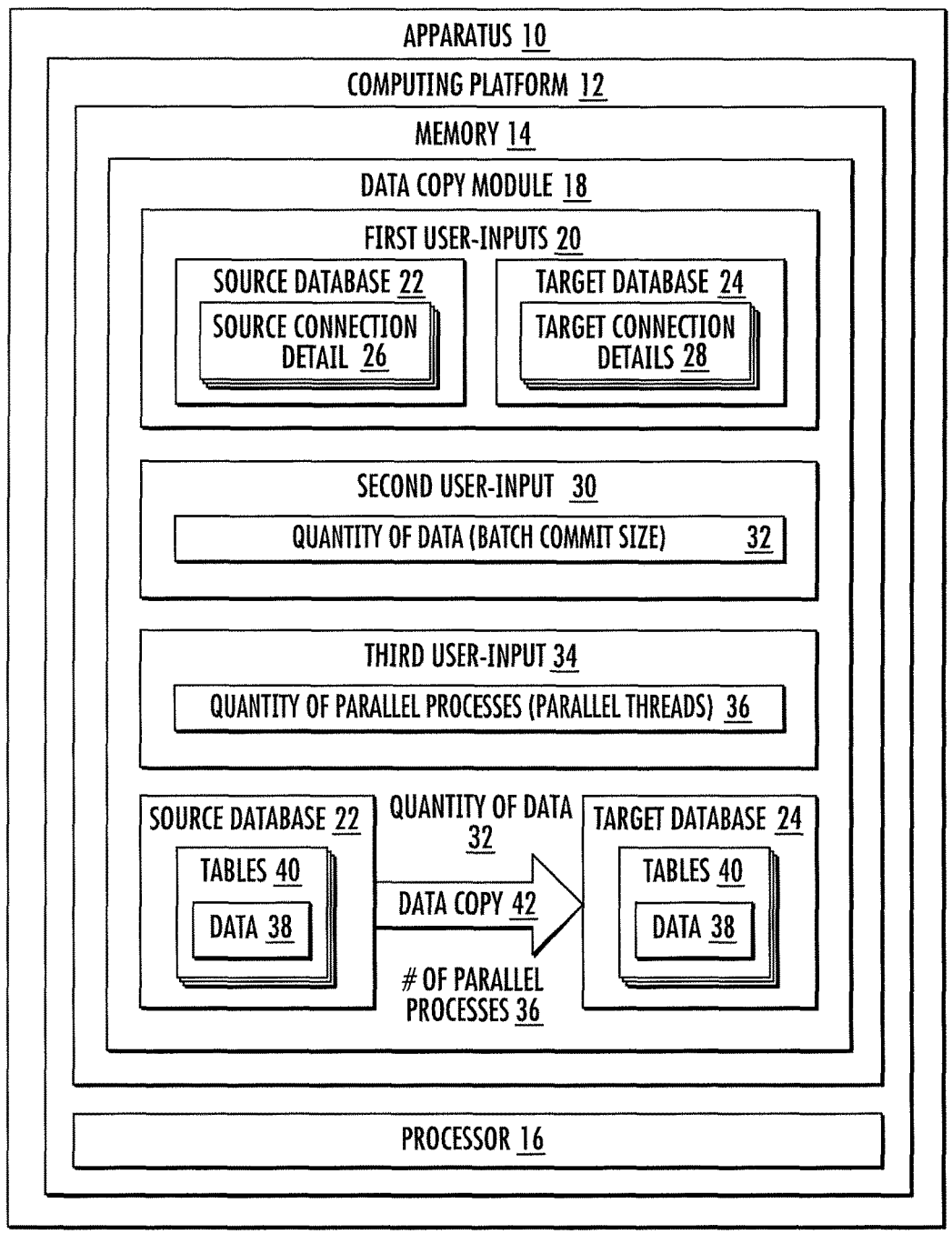
Figure 2:
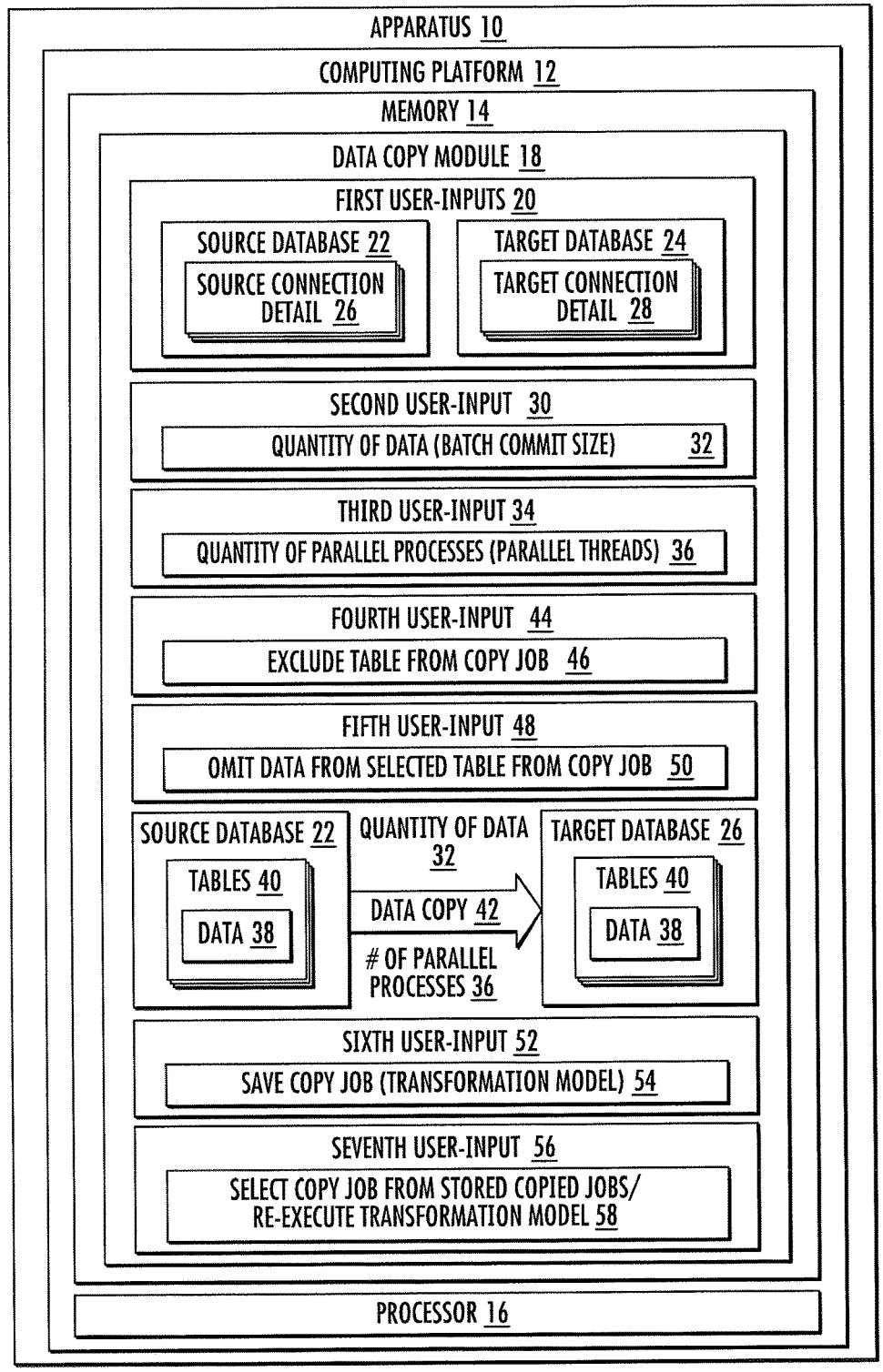
Figure 3:
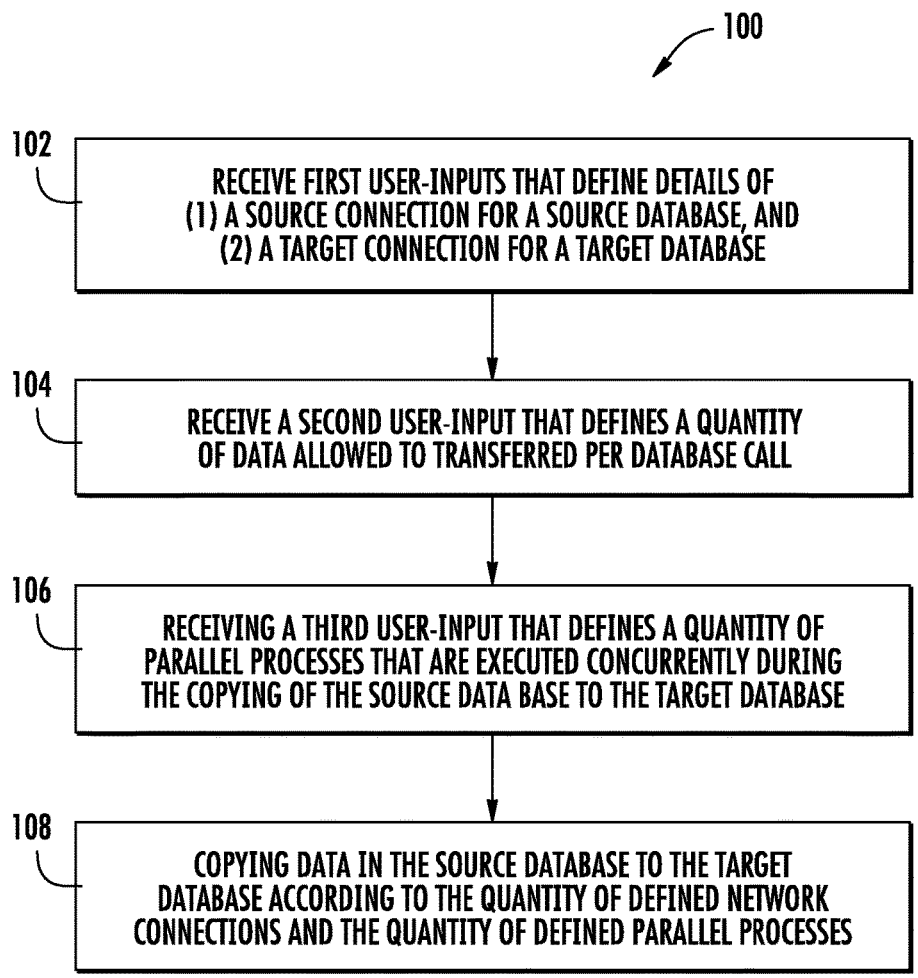

Having thus described embodiments of the invention in general terms, reference will now be made to the accompanying drawings, which are not necessarily drawn to scale, and wherein:

FIG. 1 is block diagram of an apparatus configured for high performance data copying, in accordance with embodiments of the present invention;

FIG. 2 is a block diagram of a more detailed apparatus configured for high performance data copying, in accordance with embodiments of the present invention;

FIG. 3 is a flow diagram of a method for high performance data copying, in accordance with embodiments of the present invention; and FIGS. 4-14 are schematic diagrams of user-interfaces configured for performing a data copy operation, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, SAS or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention relate to systems, apparatus, methods, and computer program products for a high performance data copy utility that is operable to dynamically copy data from a source database to a target database in an object-relational database environment. High performance is realized by defining, prior to copying the data, performance boundaries of the source and target environment, such as the quantity of data (i.e., commit points) and quantity of parallel processes (i.e., parallel threads) applicable to a copy job. In this regard, the data copy process of the present invention is tunable, on a copy job-to-copy job basis, in terms of the speed of a copy job. By optimizing the quantity of data and/or parallel processes, other users of the source and/or target can continue to access these databases without being negatively impacted, in terms of speed, by the ongoing copying process.

In additional embodiments, the copying schema of the present invention allows for data to be copied from one database to another database without the need higher level privileges, such as database administrator (DBA) or data definition language (DDL), which would otherwise require changing the structure of the database and/or custom code. In this regard, embodiments of the present invention rely solely on lower-level data manipulation language (DML) privileges configured for inserting, updating and deleting data structures. As such, the present invention, which is generic in design, does require custom programming complexity as would be required by a conventional extract, transform and load (ETL) tool or the like.

The copy process of the present invention supports automated and configurable mapping of the differences between source and target models. In addition, the copy process provides automatic table and column mapping even for differences in schema structure.

Additionally, the data copy process of the present invention allows users the option to exclude tables and/or choose data objects to omit/filter from the copy process. Moreover, when data objects are inserted or deleted, the present invention provides for dependency calculations to occur, such that the user is notified as to tables which may have dependency based on the inserted or deleted data object.

In addition, present embodiments herein disclosed, provided the user the capability to save and recall specific copy job mapping configurations for subsequent re-use. Additionally, the present invention provides for reporting for differences between the databases both at the database level and the table level.

FIG. 1 provides a high level schematic diagram of an apparatus 10 configured for high performance data copy utility that is operable to dynamically copy data from a source database to a target database in an object-relational database environment, in accordance with embodiments of the present invention. The apparatus 10 includes a computing platform 12 having and a memory 14 and at least one processor 16 that is in communication with the memory. The memory 14 of apparatus 10 stores data copy module 18, which is configured to provide high performance data copy in an object-relational database environment.

Figure 4:
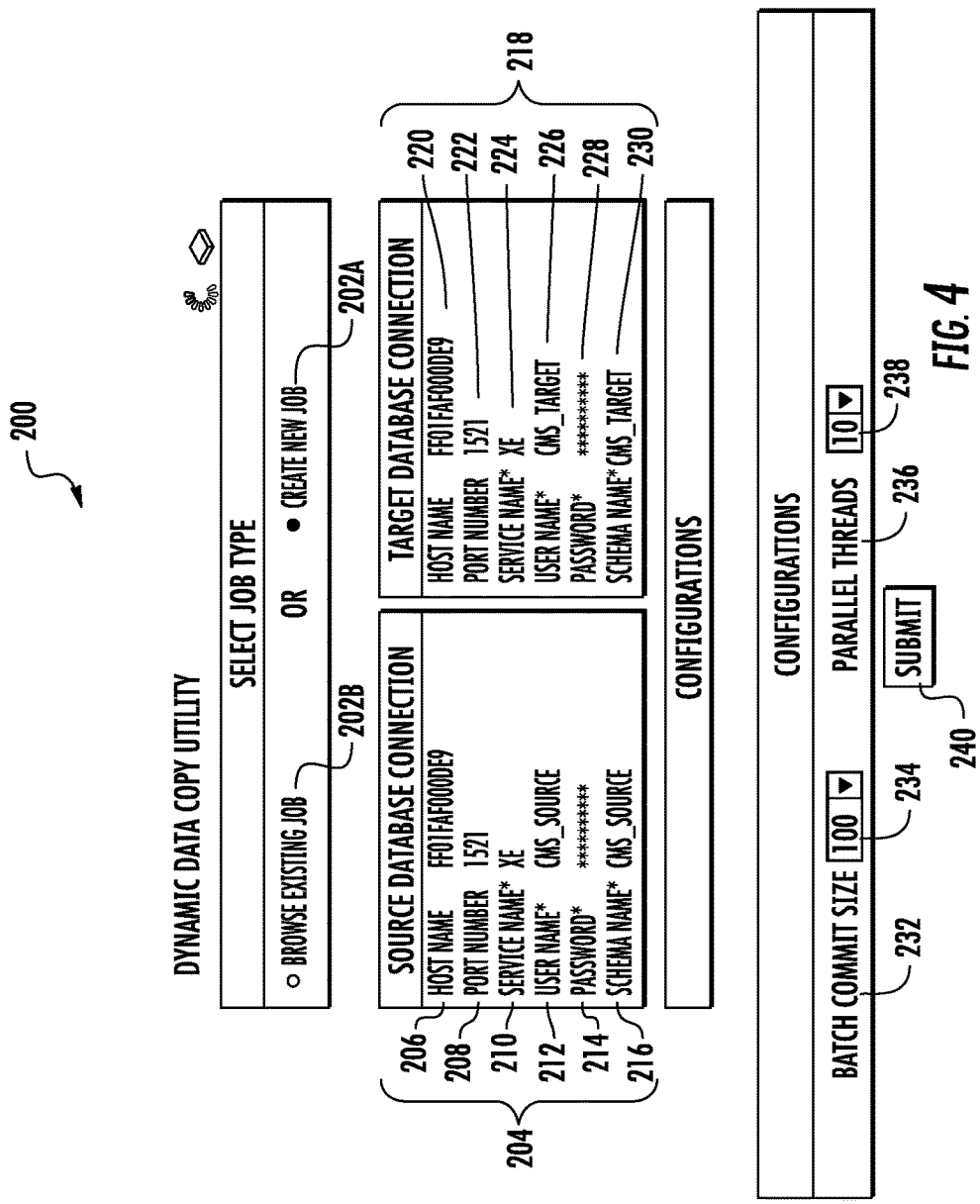

Data copy module 18 is configured to receive first user-inputs 20 that define source connection details 26 for a source database 22 from which data will be copied and target connection details 28 for a target database 24 to which the data will be copied. FIG. 4, discussed infra, provides an example of a user-interface provided by the data copy module for receiving first user-inputs (i.e., source connection details 26 and target connection details 28). The source connection details 26 and the target connection details 28 may include, but are not necessarily limited to, a host name, a port number, a service name, a user name, a user password (for accessing the database), a schema/database name or the like.

Data copy module 18 is further configured to receive a second user-input 30 that defines a quantity of data transferred per database call 32 (i.e., a batch commit size) for copying the source database 22 to the target database 24. Each connection supports a corresponding process in the copying of the data from the source database to the target database. In addition, data copy module 18 is further configured to receive a third user-input 34 that defines a quantity of parallel processes 36 (i.e., parallel threads) that are executed concurrently during the copying of the data from the source database 22 to the target database 24. FIG. 4, discussed infra, highlights a user-interface provided by the data copy module 18 that is configured to receive the second and third user-inputs 30 and 34 that define the quantity of data transferred per database call 32 and the quantity of parallel processes 36.

Further, copy module 18 is configured to copy 42 the data 38 (typically, in the form of tables 40) from the source database 22 to the target database 24 according to the quantity of defined data transferred per database call 32 and the defined quantity of parallel processes 36. By conducting the copy job in accordance with the defined quantity of data transferred per database call 32 and the quantity of parallel processes 36, the present invention optimizes performance of the data copy job (i.e., the speed of the data copy job) based on the user taking into account network configurations and database size. Thus, by making the data copy job tunable, in terms of data transferred per database call and parallel processes, to specific environments (i.e., network settings, network latency, database size and the like), the present invention provides a performance-oriented data copy process, which positively impacts other concurrent users of the source and/or target databases.

Referring to FIG. 2, shown is a more detailed block diagram of apparatus 10, in accordance with various other specific embodiments of the present invention. As previously noted in relation to the discussion of FIG. 1, the apparatus 10 is configured high performance data copy utility that is operable to dynamically copy data from a source database to a target database in an object-relational database environment. In addition to providing greater detail, FIG. 2 highlights various alternate and/or optional embodiments of the invention. The apparatus 10 may include one or more of any type of computing device. The present apparatus and methods can accordingly be performed on any form of one or more computing devices.

The apparatus 10 includes computing platform 12 that can receive and execute algorithms, such as routines, and applications. Computing platform 12 includes memory 14, which may comprise volatile and non-volatile memory, such as read-only and/or random-access memory (RAM and ROM), EPROM, EEPROM, flash cards, or any memory common to computer platforms. Further, memory 14 may include one or more flash memory cells, or may be any secondary or tertiary storage device, such as magnetic media, optical media, tape, or soft or hard disk.

Further, computing platform 12 also includes processor 16, which may be an application-specific integrated circuit ("ASIC"), or other chipset, processor, logic circuit, or other data processing device. Processor 16 or other processor such as ASIC may execute an application programming interface ("API") (not shown in FIG. 2) that interfaces with any resident programs, such as data copy module 18 and routines associated therewith or the like stored in the memory 14 of the apparatus 10.

Processor 16 includes various processing subsystems (not shown in FIG. 2) embodied in hardware, firmware, software, and combinations thereof, that enable the functionality of apparatus 10 and the operability of the apparatus on a network. For example, processing subsystems allow for initiating and maintaining communications and exchanging data with other networked devices. For the disclosed aspects, processing subsystems of processor 14 may include any subsystem used in conjunction with data copy module 18 and related algorithms, sub-algorithms, sub-modules thereof.

Computer platform 12 may additionally include communications module (not shown in FIG. 2) embodied in hardware, firmware, software, and combinations thereof, that enables communications among the various components of the apparatus 10, as well as between the other networked devices. Thus, communication module may include the requisite hardware, firmware, software and/or combinations thereof for establishing and maintaining a network communication connection.

As previously discussed in relation to FIG. 1, the memory 14 of apparatus 10 stores data copy module 18 that is configured to receive first user-inputs 20 that define source connection details 26 for a source database 22 from which data will be copied and target connection details 28 for a target database 24 to which the data will be copied. Data copy module 18 is further configured to receive a second user-input 30 that defines a quantity of data transferred per database call 32 (i.e., a batch commit size) for copying the source database 22 to the target database 24. In addition, data copy module 18 is further configured to receive a third user-input 34 that defines a quantity of parallel processes 36 (i.e., parallel threads) that are executed concurrently during the copying of the data from the source database 22 to the target database 24.

Further, data copy module 18 is configured to receive one or more fourth user-input 44 that exclude a table from the copy job 46 prior to executing the copy job. FIGS. 5-9, discussed infra, highlight one example of a user-interface configured to receive user-inputs that exclude a table from the copy job. In specific embodiments, in response to receiving a fourth user-input 44 that excludes a table, the user may be presented an indication of which tables dependent upon the excluded table, such that, excluding the table from the copy job will additionally result in automatic exclusion of those tables that are dependent upon in the excluded table.

In addition, data copy module 18 is configured to receive one or more fifth user-inputs 48 that omit, from the copy job, data objects/items from a selected table 50. In specific embodiments, as discussed infra. in relation to FIGS. 5-9, the data copy module 18 may be configured to allow a user to select an "edit" option associated with a corresponding table and, upon selection of the table, allow the user to change an auto-generated structured-query language (SQL) query to filter out (i.e., omit) or mask specific data objects.

As previously discussed in relation to FIG. 1, the data copy module 18 is configured to copy 42 the data 38 (typically, in the form of tables 40) from the source database 22 to the target database 24 according to the quantity of defined data transferred per database call 32 and the defined quantity of parallel processes 36. Additionally, as previously discussed, the copying of the data may be in accordance to any of the previously defined table exclusions and/or data object filters/masks.

Data copy module 18 is additionally configured to receive a sixth user-input 52 that save the copy job 54, which serves to save the transformation model/map associated with the copy job and a seventh user-input 56 that selects a copy job from a stored listing of previous copy jobs 58 for the purpose of re-executing the copy/job/transformation model. In this regard, a user may subsequently recall, from a listing of previously saved copy jobs, the copy job for the purpose of subsequently re-executing the same copy job or executing the copy job in a different environment (i.e., same source database copied to a different target database).

Referring to FIG. 3, a flow diagram is presented of a method 100 for high performance data copying that is operable to dynamically copy data from a source database to a target database in an object-relational database environment, in accordance with embodiments of the present invention. At Event 102, first user-inputs are received that define source connection details for a source database from which data will be copied and target connection details for a target database to which the data will be copied. The source connection details and the target connection details may include, but are not necessarily limited to, a host name, a port number, a service name, a user name, a user password (for accessing the database), a schema/database name or the like.

At Event 104, a second user-input is received that defines a quantity of data per database call (i.e., a batch commit size) for copying the source database to the target database. Each connection supports a corresponding process in the copying of the data from the source database to the target database. At Event 106, a third user-input is received that defines a quantity of parallel processes (i.e., parallel threads) that are executed simultaneously (i.e., in parallel) during the copying of the data from the source database to the target database.

At Event 108, the data is copied from the source database to the target database according to the quantity of defined data transferred per database call and the defined quantity of parallel processes 36. By conducting the copy job in accordance with the defined quantity of data per database call 32 and the quantity of parallel processes 36, the present invention optimizes performance of the data copy job (i.e., the speed of the data copy job) based on the user taking into account network configurations and database size.

Referring to FIGS. 4-14 exemplary user-interfaces are shown for requesting a copy job, in accordance with embodiments of the present invention. FIG. 4 provides an example of user-interface 200 for inputting source and target database details and defining batch commit size (i.e., quantity of data transferred per database call) and quantity of parallel threads (i.e., parallel processes), in accordance with embodiments of the present invention. The user-interface 200 is configured to allow the user to select a copy job type, as such user-interface 200 includes an activatable radio keys "create new job" 202A and "browse existing jobs" 202B. As previously discussed and as discussed infra., the present invention allows the user to save a transformation model related to a copy job and subsequently browse and select from the saved copy jobs to re-execute the transformation model/copy job. In the illustrated example of FIG. 4, the user has selected the "create new job" 202A option, which requires the user to input requisite source database connection details 204 and target database connection details 218. The source database connection details 204 include host name 206, port number 208, service name 210, user name 212, user password 214 and schema name 216. Similarly, the target database connection details 218 include host name 220, port number 222, service name 224, user name 226, user password 228 and schema name 230. The source and target database connection details 204 and 218 shown in FIG. 4 are by way of example and, as such, more or less database connection details may be required in other embodiments of the invention. It should be noted that in instances in which the copy job is selected from previously saved copy jobs (i.e., the user activates "browse existing job" 202B, and selects from a listing of previously saved copy jobs) the source database connection details 204 and target database connection details 218 may be pre-populated in the user-interface 200 and the user may provide further inputs (i.e., edits) to change the pre-populated source and/or target database connection details 204 and/or 218 (for example, the user may choose to copy the data to a different target database, which causes the user to delete the pre-populated target database connection details 218 and input new/updated target database connection details 218.

The user-interface 200 additionally includes configurations for batch commit size 232 (i.e., quantity of data transferred per database call) and parallel threads 236 (i.e., quantity of parallel processes). The user may select the batch commit size 232 from preconfigured quantities in pull-down menu 234 and the parallel threads 238 from preconfigured quantities in pull-down menu 238.

Figure 5:
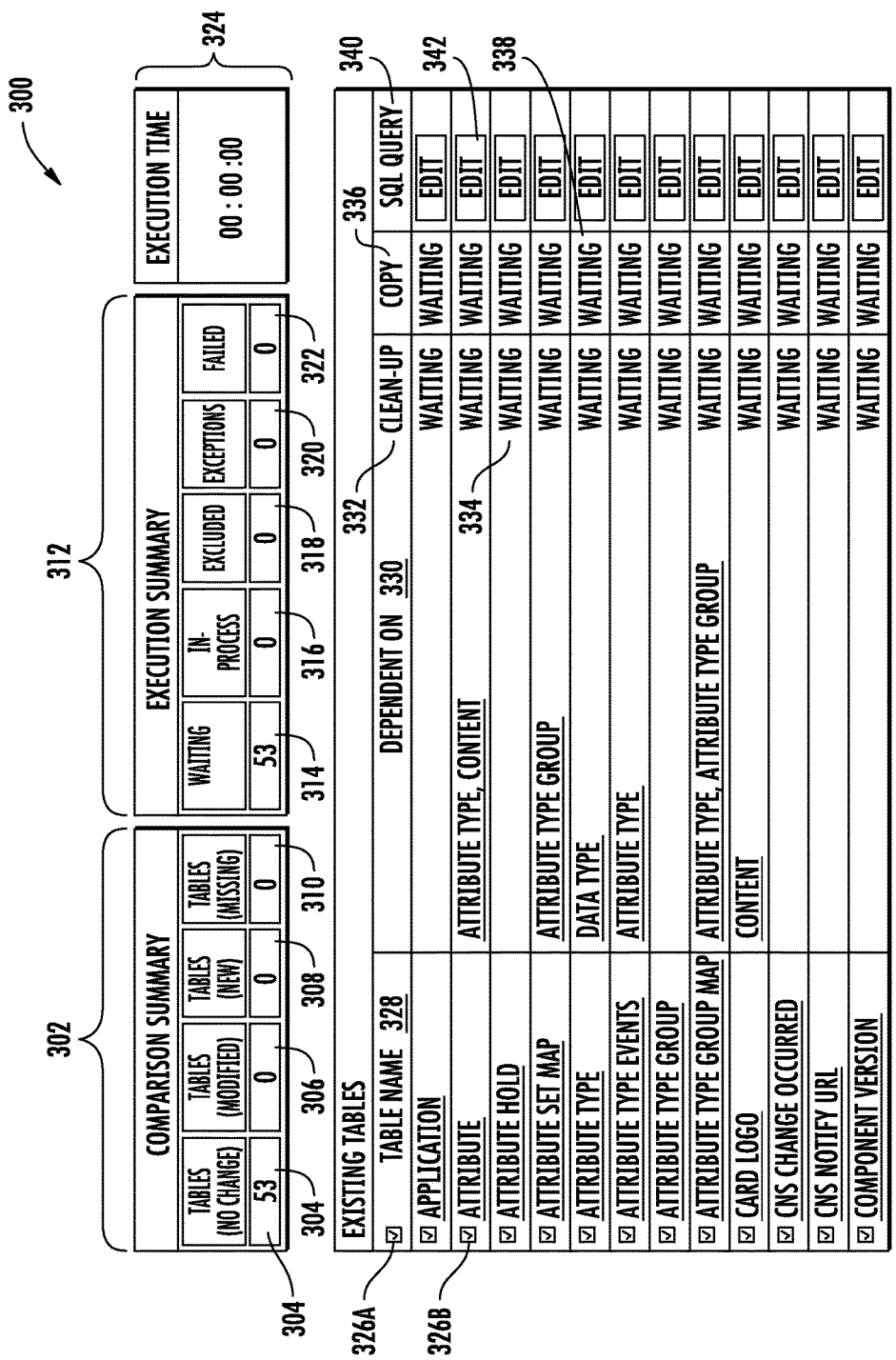

Once the source and target database connections details 204 and 218 have been inputted (or confirmed) and the configurations (batch commit size 232 and parallel threads 236) have been inputted/selected, the user may engage the submit key 240, which compiles details of both source and target databases and provides a comparison between the two databases, as shown and described in the user-interface 300 shown in FIG. 5. It should be noted that engagement of the submit key 240 merely queues up the data copy job and does not begin the migration/copying of data from the source database to the target database.

Referring to FIG. 5, an exemplary user-interface 300 is shown that depicts the status of the copy job and provides for indication of database comparison and copy job execution results, in accordance with an embodiment of the invention. User-interface 300 is displayed as a result of the user activating the submit key 240, shown and described in FIG.

4. User-interface 300 includes a comparison summary 302 of the source and target databases including the number of tables that require no change 304, the number of changes that require modification 306, the number of new tables 308 and the number of missing tables 310. Comparison summary 302 is dynamically updated while the migration/copying of data occurs.

User-interface 300 additionally includes execution summary 312 that includes the number of tables waiting copying 314, the number of tables currently being copied 316, the number of tables excluded from the copy job 318, the number of tables having completed copying 320 and the number of tables in which copying failed 322. Similar to the comparison summary 302, the execution summary 312 is dynamically updated while the migration/copying of data occurs. Additionally, user-interface 300 includes execution timer 324 that displays the current running time of the migration/copy process.

Moreover, user-interface 300 includes a column listing of the existing table names 328 in the source database and a column listing of the table(s) that an associated table is dependent on 330. The tables listed in the table name 328 column and the dependent on 330 column provide for hyperlinks, such that "clicking on" or activating the hyperlink will provide further details related to the associated table.

In addition, user-interface 300 provides clean-up column 322 and copy column 336. Clean-up column 322 provides the status of the clean-up process (i.e., deletion of pre-existing data in the target database so as to allow for insertion/copying of the data in the source database). In the illustrated example of FIG. 5, all of the statuses in the clean-up column 332 indicating "waiting" 334, since the migration/copying of data has yet to be initiated. Copy column 336 provides the status of the copy process, which may be initiated upon completion of the clean-up process. In the illustrated example of FIG. 5, all of the statuses in the copy column 336 indicating "waiting" 338, since the migration/copying of data has yet to be initiated.

Additionally, user-interface 300 includes exclusion check boxes 326 which allow the user to select all tables (326A) or a specific table (326B) for exclusion from the copy job process. In the illustrated embodiment of FIG. 5, a check in a corresponding box indicates that the table is included in the copy process and an unchecked box in a corresponding box indicates that the table is excluded from the copy process. It should be noted that exclusion of a table from the copy process will automatically affect the exclusion of other tables that are dependent upon the excluded table. As such, in specific embodiments, when the user selects a table for exclusion (i.e., unchecks an exclusion box) the user may be presented with an indication of which tables are dependent upon the selected table (for example, the exclusion boxes associated with the tables that are dependent upon the selected excluded table may automatically change from checked to unchecked and/or the user may be presented with a notification window that indicates which other tables that are dependent upon the selected table will also be excluded).

In addition, user-interface 300 includes SQL (Structured Query Language) query column 340 which includes a corresponding edit key 342 from each existing table. A user may activate (i.e., "click-on") a corresponding edit key 342 to display the auto-generated default SQL queries that are used to migrate/copy the data from the source database to the target database. The user can edit the SQL queries to filter-out/mask specific data items/objects that the user desires to omit from the copy process.

Figure 6:
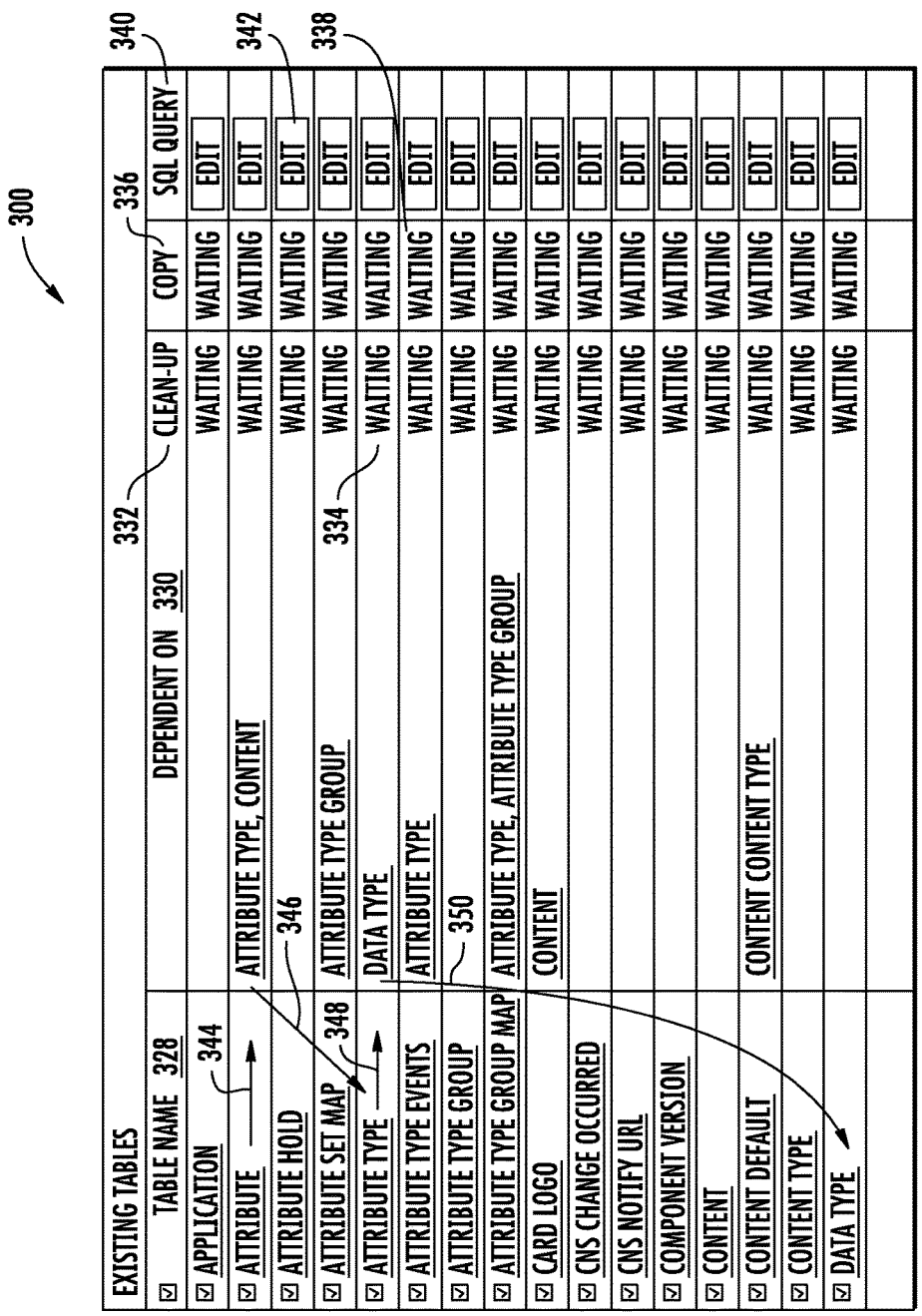

Referring to FIG. 6, an exemplary user-interface 300 is shown that highlights table dependency for a database awaiting data migration/copy, in accordance with an embodiment of the invention. In accordance with embodiments of the present invention, the data copy module is configured to automatically identify the dependencies in amongst the tables in the databases and automatically order the migration/copying of data so as to account for the dependencies. The arrows provided in FIG. 6 demonstrate one specific chain of dependency. Arrow 344 indicates that the "Attribute" table is dependent on the "Attribute Type" and "Type Content" tables and, as such, the data copy module is configured to order the copy process, such that, the "Attribute Type" and "Type Content" tables must complete copying from the source database to target database prior to the start of the copying of the "Attribute" table. Arrows 346 indicates the listing of the "Attribute Type" table and arrow 348 indicate that the "Attribute Type" table is dependent on the "Data Type" table and, as such, the data copy module is configured to order the copy process, such that, the "Data Type" table must complete copying from the source database to target database prior to the start of the copying of the "Attribute Type" table. Arrow 350 indicates the listing "Data Type" table, which has no dependencies. Thus, dependencies, as shown, will dictate that the "Data Type" table be copied first, followed by the "Attribute Type" table, which is followed by the "Attribute" table (which also will be preceded by the copying of the "Type Content" table.

Figure 7:
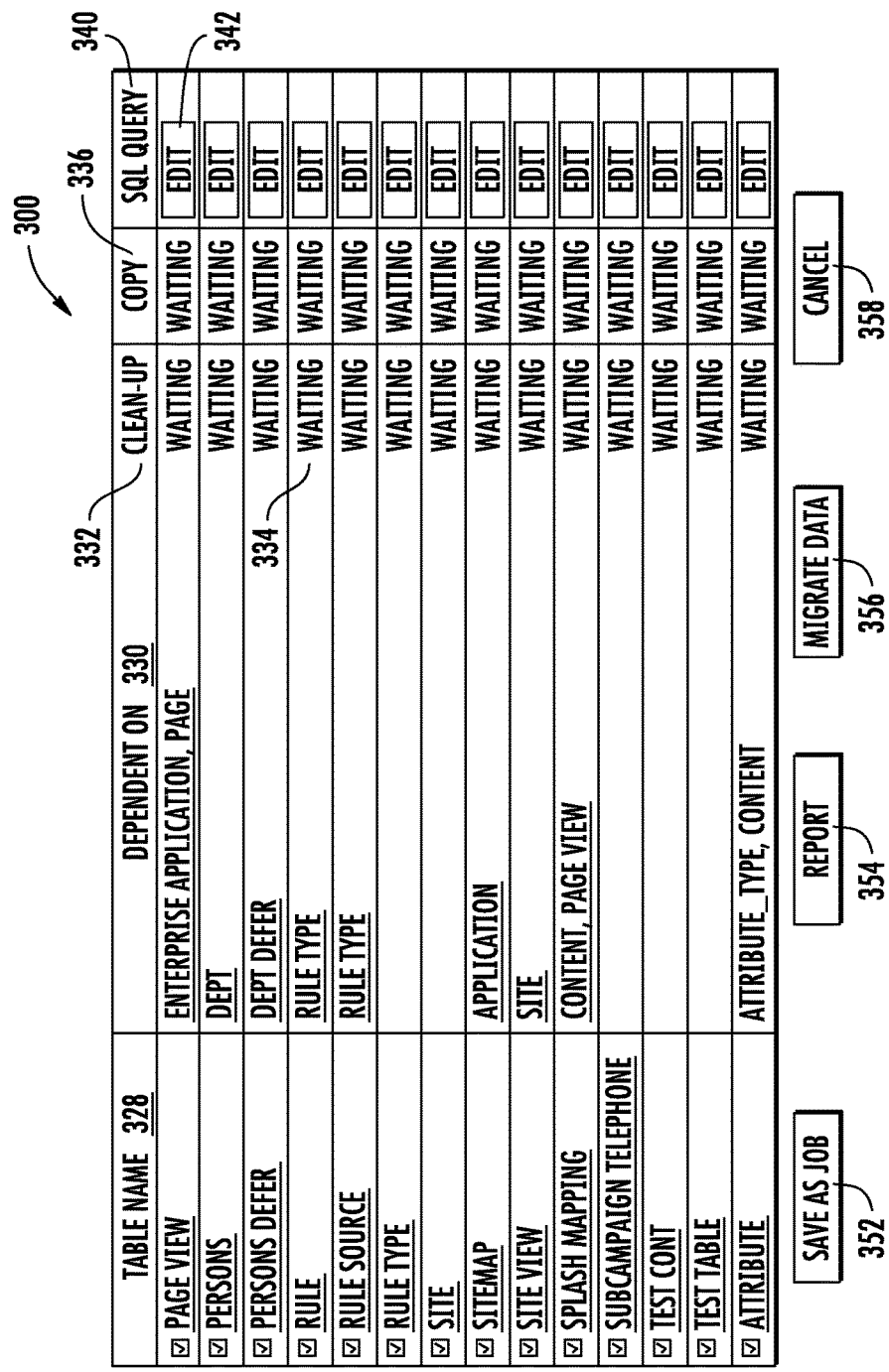

Turning the reader's attention to FIG. 7, an exemplary user-interface 300 is shown that highlights, among other features, a means for initiating the migration/copying of data from the source database to the target database, in accordance with an embodiment of the invention. FIG. 7 highlights the functionality provided if the user were to scroll to the bottom of the list existing tables presented in FIGS. 4 and 5. The user-interface 300 shown in FIG. 7 includes "save as job" key 352 that is activatable by the user to save the transformation model associated with the copy job. In those instances in which the user saves the copy job/transformation model, the user may activate the "browse existing job" radio key 202B shown in FIG. 4 to locate the saved copied job/transformation model and re-execute the copy job in the same or different environment.

Additionally, user-interface 300 includes "migrate data" key 356 that is activatable by the user to initiate the migration/copying of data from the source database to the target database. As such, a user will activate the "migrate data" key 356 after the user has excluded any tables they desire to have excluded from the copy job and/or edited the SQL query to omit/filter data items/objects or the like. One the user has activated the "migrate data" key 356, the copy job will initiate (i.e., the clean-up process will begin, followed by the copying of data from the source to the target in accordance with the requisite copying order as determined based on table dependencies).

In addition, user-interface 300 includes "report" key 354 that is activatable by the user to generate a report that provides the details of the results of the data copy job (i.e., after the data has finished migration/copy from the source database to the target database). Additionally, user-interface 300 includes "cancel" key 358 that is activatable by the user to cancel the queued-up (i.e., awaiting migration) copy job and return the user to the user-interface 200 shown in FIG. 4.

Figure 8:
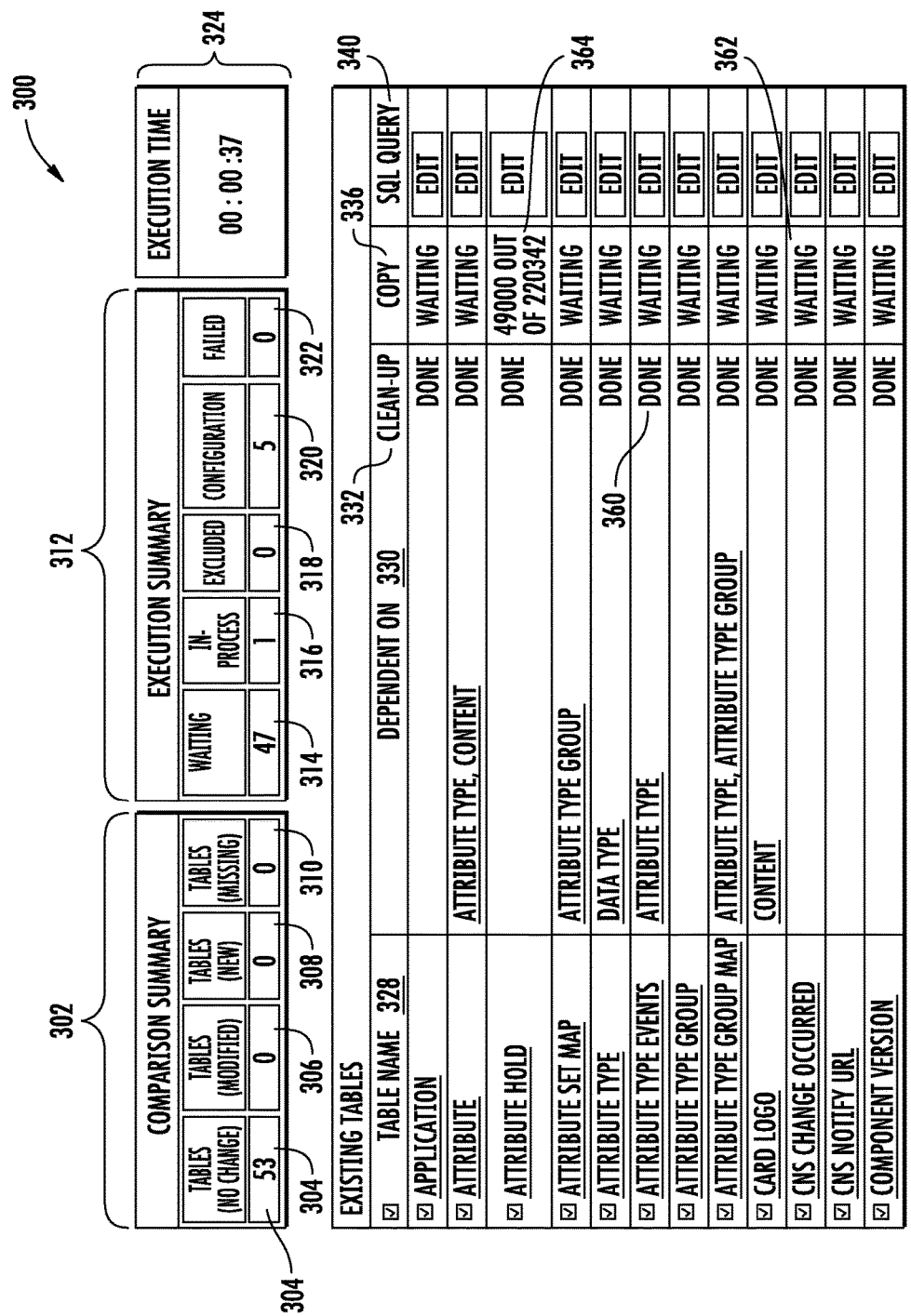

Referring to FIG. 8, user-interface 300 is shown highlight dynamic copy job status updating, in accordance with embodiments of the present invention. The user-interface 300 of FIG. 8 provides a snapshot of the dynamically changing user-interface 300 as the copying of data progresses (i.e., the user has activated the "migrate data" key 356 discussed in relation to FIG. 7). The execution timer 324 indicates that the copy job is currently at the 37 second mark. The execution summary 312 indicates that forty-two tables are waiting 314 copying, one table is currently in the process of copying and five tables have completed copying. All of the clean-up processes have been completed as evident by all of the entries in the clean-up column 332 indicating a status of "done" 360. The copy column 336 indicates that certain tables are waiting 361 to start the migration/copy process, other tables are currently undergoing 364 the migration/copy process and still other tables have completed 362 the copy process. Entries in the copy column that denote a table currently undergoing 364 the migration/copy include a running counter of the number of data objects that have been copied and the total number of data objects in the table. In the illustrated example of FIG. 8, the attribute hold table is currently undergoing 364 migration/copy and 4900 out of 2299748 data objects have currently been copied to the target.

Similarly, referring to FIG. 9, the execution timer 324 of user-interface 300 indicates that the copy job is currently at the 2 minute, 11 second mark. The execution summary 312 indicates that fifteen tables are waiting 314 copying, one table is currently in the process of copying and thirty-seven tables have completed copying. The attribute table is currently undergoing 368 migration/copy and 26700 of the 228305 data objects in the attribute table have been copied. As previously discussed in FIG. 5, the copying of the attribute table ensued only after the tables which the attribute table is dependent on have completed their respective copy/migration. Thus, as shown in FIG. 9, attribute type has completed 366 the copy/migration process as has the content table (the status of which is outside of the viewable range of user-interface 300 shown in FIG. 9).

FIG. 10 illustrates user-interface 300 after the copy job has been completed, in accordance with embodiments of the present invention. Pop-up window 370 is displayed indicating that the copy job has successfully completed. In addition, pop-up window 370 provides for user-activatable "save and close" key 372 and "close" key 374. "Save and close" key 372 provides for user-interface 300 to be closed and for the results of the copy/migration job to be saved for archiving purposes, while "close" key 374 provides for the user-interface 300 to be closed without saving the results of the copy/migration job.

Figure 11:
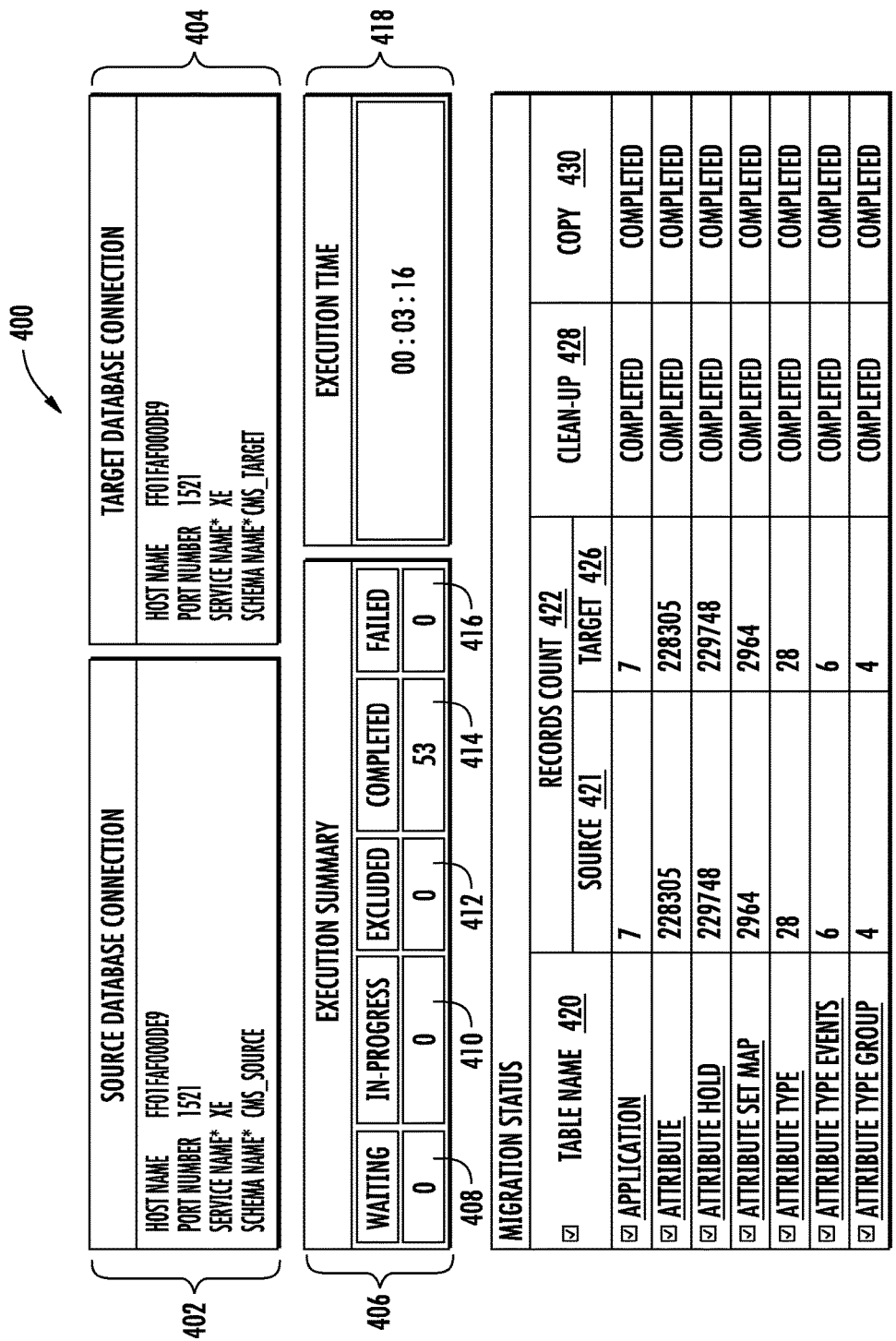

Referring to FIG. 11, a user-interface is shown that highlights details of the results of a data copy job. In accordance with embodiments of the present invention. The user-interface 400 includes details of the source database connection 402 and details of the target database connection 404. In addition, user-interface 400 includes an execution summary 406 that includes the quantity of tables waiting copying 408, the quantity of tables currently undergoing copying 410, the quantity of table excluded from the copy job 412, the quantity of tables that completed copying 414 and the quantity of tables that failed the copy process 416. Additionally, user-interface 400 includes execution timer 418 that indicates the overall time of the copy job. Additionally, user-interface 400 includes migration status summary data that includes a table name column 420 and a records count columns 422 that includes columns for the quantity of individual data objects/records in the source table 421 and the quantity of individual data objects/records in the target table 426. The same quantity of data objects/records in the corresponding target and source listing indicates that the entire table was successfully copied from the source to the target. Migration status summary data additionally includes clean-up column 428 and copy column 430 which indicates the corresponding status of clean-up process (i.e., either success, failed or excluded) and the copy progress (i.e., either completed, failed or excluded).

Referring to FIGS. 12-14, another feature of the data copy module is the ability to access historical data related to previous copy jobs, in accordance with further embodiments of the invention. FIG. 12 illustrates a portion of the user-interface 200 shown and described in FIG. 4. FIG. 12 highlights user-interface 200 inclusion of activatable icons that configured to provide the user help information and historical copy job information. In the example shown in FIG. 12, first icon 242, which is located in the upper-right hand corner of user-interface 200, is activatable to provide the user access to historical copy job information. Additionally, second icon 244 is activatable to provide the user assistance in using the data copy module (i.e., performing a data copy operation).

In specific embodiments of the invention, activation of the first icon 242 results in the presentation of user-interface 500 shown in FIG. 13. User-interface 500 includes time period selection 502 that is configured to allow the user to select a time period over which historical data copy information is to be presented. In the illustrated example, user-interface 500 includes drop-down menu 504 which is preconfigured to include time period selection options in the form of year and month. Once the user has selected a time period, the user will activate submit key 506, which will result in the presentation of the historical copy job data for the selected time period.

Referring to FIG. 14, a user-interface 600 is provided that includes historical copy job data, in accordance with embodiments of the present invention. Historical copy job data may be required for auditing purposes or the like. In specific embodiments, the user-interface 600 may be presented to the user in response to the user selecting a time period and activating the submit key 506 shown in FIG. 13. User-interface 600 is configured to include time period selection 602, drop-down menu 604 and submit key 606 similar in functionality to those shown and described in relation to FIG. 13. Time period selection 602, drop-down menu 604 and submit key 606 allow the user the ability to change the time period over which historical copy job data is presented to the user. In the illustrated example of FIG. 14 the historical copy job data includes username 608 (i.e., individual who performed the copy job); details related to the source database 610, including service name 612 and schema name 614; and details related to the target database 616, including service name 618 and schema name 620. Additionally, the historical copy job data includes table status information 622 including the quantity of tables that completed copying 624, the quantity of tables that failed to copy 628 and the quantity of tables excluded from copying 630. Additionally, the historical copy job data includes the date and time of the copy job 632 and the time taken (i.e., execution time) for the copy job 634.

Thus, present embodiments herein disclosed provide for a high performance data copy utility that is operable to dynamically copy data from a source database to a target database in an object-relational database environment. High performance is realized by defining, prior to copying the data, performance boundaries of the source and target environment, such as the quantity of data (i.e., commit points) and quantity of parallel processes (i.e., parallel threads)

applicable to a copy job. In this regard, the data copy process of the present invention is tunable, on a copy job-to-copy job basis, in terms of the speed of a copy job. By optimizing the quantity of data and/or parallel processes, other users of the source and/or target can continue to access these databases without being negatively impacted, in terms of speed, by the ongoing copying process. Additionally, the copying schema of the present invention allows for data to be copied from one database to another database without the need higher level privileges, such as database administrator (DBA) or data definition language (DDL), which would otherwise require changing the structure of the database and/or custom code. Moreover, the copy process of the present invention supports automated and configurable mapping of the differences between source and target models. In addition, the copy process provides automatic table and column mapping even for differences in schema structure.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for dynamically copying data from a source database to a target database in an object-relational database environment, the apparatus comprising:
    one or more networked user computing devices;
    a computing platform including a memory device and at least one processor device in communication with the memory device; and
    a data copy module stored in the memory device, executable by the processor device and configured to:
        receive first user-inputs that define details of a source connection for the source database and a target connection for the target database;
        receive a second user-input that defines a quantity of data transferred per database call allowed for copying the source database to the target database;
        receive a third user-input that defines a quantity of parallel processes that are executed concurrently during the copying of the source database to the target database;
        receive a fourth user-input that selects a table from the source database that is excluded from copying to the target database;
        in response to receiving the fourth user-input, provide indication that one or more dependent tables that depend from the selected table will be excluded from copying to the target database;
        based on the quantity of data and the quantity of parallel processes, generate an optimized copying process, wherein the optimized copying process is configured to allow for the source database and the target database to be accessed by the one or more networked user computing devices during execution of the optimized copying process without impacting a speed of the copying process; and
        execute the optimized copying process to copy data in the source database to the target database under Data Manipulation Language (DML)-only account privileges, wherein the selected table and the one or more dependent tables are excluded from the copying process.

2. The apparatus of claim 1, wherein the data copy module is further configured to provide display of a user-interface that is configured to indicate a status of the copying of the source database to the target database, wherein the status includes (1) a listing of each table existing in the source database, (2) an indication of whether data in each table in the target database has been deleted prior to copying the table from the source database to the target database, and (3) an indication of whether copying of each table (a) has yet to begin, (b) is in progress, (c) is completed, or (d) has failed.

3. The apparatus of claim 2, wherein the data copy module is further configured to provide display of the user-interface that provides (1) a comparison summary including (a) a quantity of tables copied without modification, (b) a quantity of tables copied with modification, (c) a quantity of new tables created, and (d) a quantity of tables missing; (2) an execution summary including (a) a quantity of tables waiting to be copied, (b) a quantity of tables currently being copied, (c) a quantity of tables excluded from copying, (d) a quantity of tables having completed copying, and (e) a quantity of tables that failed to copy; and (3) a timer that provides a running indication of copy execution time.

4. The apparatus of claim 2, wherein the data copy module is further configured to provide display of the user-interface that provides an indication of tables in the target database that are dependent on one or more other tables in the source database, wherein the indication includes a name of the one or more other tables.

5. The apparatus of claim 1, wherein the data copy module is further configured to receive one or more fourth user-inputs that select a table from the source database and, upon selection of the table, allows the user to identify data from the table which is to be omitted from the copying of the source database to the target database.

6. The apparatus of claim 1, wherein the data copy module is further configured to receive a fourth user-input that is configured to save, as a copy job, a customized transformation model of the copying of the source database to the target database.

7. The apparatus of claim 6, wherein the data copy module is further configured to receive a fifth user-input that selects the copy job from a listing of stored existing copy jobs and, upon selection, re-executes the transformation model to perform a subsequent copying of the source database to the target database or another target database.

8. The apparatus of claim 1 wherein the data copy module is further configured to (1) receive a fourth user-input that selects an execution history option and, (2) upon selection of a previous time period, provide display of a user-interface that indicates details of database copy jobs performed during the selected previous time period, wherein the details include identity of who performed the database copy job, details of the source database, details of the target database, copy job results, data and time of copy job and execution time of copy job.

9. A computer program product comprising:
    a non-transitory computer-readable medium comprising:
        a first set of codes for causing a computer to receive first user-inputs that define details of a source connection for a source database and a target connection for a target database;

a second set of codes for causing a computer to receive a second user-input that defines a quantity of data allowed to be transferred per database call;
a third set of codes for causing a computer to receive a third user-input that defines a quantity of parallel processes that are executed concurrently during the copying of the source database to the target database;
a fourth set of codes for causing a computer to receive a fourth user-input that selects a table from the source database that is excluded from copying to the target database and, in response to receiving the fourth user-input, provide indication that one or more dependent tables that depend from the selected table will be excluded from copying to the target database;
a fifth set of codes for based on the quantity of data and the quantity of parallel processes, causing a computer to generate an optimized copying process, wherein the optimized copying process is configured to allow for the source database and the target database to be accessed by the one or more networked user computing devices during execution of the optimized copying process without impacting a speed of the copying process; and
a sixth set of codes for causing a computer to execute the optimized copying process to copy data in the source database to the target database under Data Manipulation Language (DML)-only account privileges, wherein the selected table and the one or more dependent tables are excluded from the copying process.

10. The computer program product of claim 9, wherein the computer-readable medium further comprises a sixth set of codes for causing a computer to provide display of a user-interface that is configured to indicate a status of the copying of the source database to the target database, wherein the status includes (1) a listing of each table existing in the source database, (2) an indication of whether data in each table in the target database has been deleted prior to copying the table from the source database to the target database, and (3) an indication of whether copying of each table (a) has yet to begin, (b) is in progress, (c) is completed, or (d) has failed.

11. The computer program product of claim 9, wherein the computer-readable medium further comprises a sixth set of codes for causing a computer to receive a fourth user-input that select a table from the source database and, upon selection of the table, allows the user to identify data from the table which is to be omitted from the copying of the source database to the target database.

12. The computer program product of claim 9, wherein the computer-readable medium further comprises:
a sixth set of codes for causing a computer to receive a fourth user-input that is configured to save, as a copy job, a customized transformation model of the copying of the source database to the target database; and
a seventh set of codes for causing a computer to receive a fifth user-input that selects the copy job from a listing of stored existing copy jobs and, upon selection, re-executes the transformation model to perform a subsequent copying of the source database to the target database or another target database.

13. The computer program product of claim 9, wherein the computer-readable medium further comprises a sixth set of codes for causing a computer to receive (1) receive a fourth user-input that selects an execution history option and, (2) upon selection of a previous time period, provide display of a user-interface that indicates details of database copy jobs performed during the selected previous time period, wherein the details include identity of who performed the database copy job, details of the source database, details of the target database, copy job results, data and time of copy job and execution time of copy job.

14. A method for dynamically copying data from a source database to a target database in an object-relational database environment, the method comprising:
receiving, by a computing device processor, first user-inputs that define details of a source connection for a source database and a target connection for a target database;
receiving, by a computing device processor, a second user-input that defines a quantity of data allowed to be transferred per database call;
receiving, by a computing device processor, a third user-input that defines a quantity of parallel processes that are executed concurrently during the copying of the source database to the target database;
receiving, by a computing device processor, a fourth user-input that selects a table from the source database that is excluded from copying to the target database;
in response to receiving the fourth user-input, providing indication that one or more dependent tables that depend from the selected table will be excluded from copying to the target database;
based on the quantity of data and the quantity of parallel processes, generating, by a computer device processor, an optimized copying process, wherein the optimized copying process is configured to allow for the source database and the target database to be accessed by the one or more networked user computing devices during execution of the optimized copying process without impacting a speed of the copying process; and
executing the optimized copying process to copy, by a computing device processor, data in the source database to the target database, wherein the copying occurs according to the quantity of defined data allowed to be transferred per database call and the quantity of defined parallel processes and the selected table and the one or more dependent tables are excluded from the copying process.

15. The method of claim 14, further comprising generating, by a computing device processor, and providing display of a user-interface that is configured to indicate a status of the copying of the source database to the target database, wherein the status includes (1) a listing of each table existing in the source database, (2) an indication of whether data in each table in the target database has been deleted prior to copying the table from the source database to the target database, and (3) an indication of whether copying of each table (a) has yet to begin, (b) is in progress, (c) is completed, or (d) has failed.

16. The method of claim 14, further comprising (1) receiving a fourth user-input that selects an execution history option and, (2) upon selection of a previous time period, providing display of a user-interface that indicates details of database copy jobs performed during the selected previous time period, wherein the details include identity of who performed the database copy job, details of the source database, details of the target database, copy job results, data and time of copy job and execution time of copy job.

* * * * *